(12) United States Patent
Chen et al.

(10) Patent No.: US 10,770,988 B2
(45) Date of Patent: Sep. 8, 2020

(54) NON-LINEAR DROOP CONTROL

(71) Applicant: Virginia Tech Intellectual Properties, Inc., Blacksburg, VA (US)

(72) Inventors: Fang Chen, Blacksburg, VA (US); Rolando Burgos, Blacksburg, VA (US); Dushan Boroyevich, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 468 days.

(21) Appl. No.: 15/296,564

(22) Filed: Oct. 18, 2016

(65) Prior Publication Data
US 2017/0110880 A1 Apr. 20, 2017

Related U.S. Application Data

(60) Provisional application No. 62/243,690, filed on Oct. 20, 2015.

(51) Int. Cl.
*H02J 7/34* (2006.01)
*H02M 7/493* (2007.01)
(Continued)

(52) U.S. Cl.
CPC ............ *H02M 7/493* (2013.01); *H02J 1/102* (2013.01); *H02J 7/34* (2013.01); *H02J 7/35* (2013.01); *Y02E 10/766* (2013.01)

(58) Field of Classification Search
CPC .... H02J 3/383; H02J 3/386; H02J 7/35; H02J 1/102; H02J 7/34; H02M 1/08;
(Continued)

(56) References Cited

U.S. PATENT DOCUMENTS 7,577,006 B2 8/2009 Neacsu
9,760,139 B2 * 9/2017 Chueh ................... G06F 1/263

OTHER PUBLICATIONS

Authors: Fang Chen, Rolando Burgos, Dushan Boroyevhic, Wei Zhang Title: A Nonlinear Droop Method to Improve Voltage Regulation and Load Sharing in DC Systems Date of conference: Jun. 7-10, 2015; Publisher: IEEE; Edition: DC Microgrids (ICDCM), 2015 IEEE First International Conference; Pertinent pp. 45-50.*

(Continued)

*Primary Examiner* — Richard Tan
(74) *Attorney, Agent, or Firm* — Thomas | Horstemeyer, LLP (57) ABSTRACT

Aspects of non-linear droop control are described herein. In one embodiment, a system includes a first power converter or source configured to provide power to a bus, a second power converter or source configured to provide power to the bus, and a load electrically coupled to the bus. The system also includes a controller configured to adjust a droop resistance associated with the first power source according to a continuous non-linear function based on an amount of current supplied to the load by the first power source. The system can also include a second controller configured to adjust a droop resistance associated with the second power source according to the continuous non-linear function (or another continuous non-linear function). The use of the continuous non-linear functions achieves tighter voltage regulation particularly at lower loads and better load sharing at higher loads.

17 Claims, 12 Drawing Sheets

(51) Int. Cl.
*H02J 7/35* (2006.01)
*H02J 1/10* (2006.01)

(58) Field of Classification Search
CPC .. H02M 7/04; H02M 3/04; H02M 2001/0009; H02M 7/493; Y02E 10/766
USPC ........................................................ 307/52
See application file for complete search history.

(56) References Cited

OTHER PUBLICATIONS

Author: Kim et al.; Title: "Mode Adaptive Droop Control with Virtual Output Impedances for an Inverter-Based Flexible AC Microgrid"; Date (Mar. 2011); Publisher: IEEE; vol. 26 No. 3; Pertinent pp. 689-701.*
Author: Batarseh et al. Title: Investigation of the output droop characteristics of parallel-connected DC-DC converters Date of conference: Jun. 20-25, 1994; Date added to IEEE Xplore: Aug. 6, 2002 Publisher: IEEE; Pertinent pp. 1342-1351.*
Ye et al., Design of Parallel Sources in DC Distributed Power Systems by Using Gain-Scheduling Technique, IEEE Annual Power Electronics Specialists Conference 1:161-165 vol. 1—Sep. 1999.
Kakigano et al., Distribution Voltage Control for DC Microgrids Using Fuzzy Control and Gain-Scheduling Technique, IEEE Transactions on Power Electronics, vol. 28, No. 5, May 2013.
Kim et al., A Novel Droop Method for Converter Parallel Operation, IEEE Transactions on Power Electronics, vol. 17, No. 1, Jan. 2002.
Luo et al., A Classification and Evaluation of Paralleling Methods for Power Supply Modules, Power Electronics Specialists Conference, 1999. PESC 99. 30th Annual IEEE, Jul. 1999.

* cited by examiner

NON-LINEAR DROOP CONTROL

CROSS-REFERENCE TO RELATED APPLICATIONS

This application claims the benefit of priority to U.S. Provisional Application No. 62/243,690, titled "A Non-Linear Droop Method to Improve Voltage Regulation in DC Systems," filed Oct. 20, 2015, the entire contents of which are hereby incorporated herein by reference.

BACKGROUND

Renewable energy sources like solar and wind are contributing more to the generation of electricity. The reliance on renewable energy sources has also led to the use of integrated energy storage devices to buffer the intermittent generation of energy. With emerging installations of renewable energy sources and energy storage devices, direct current (DC) distribution systems in residential houses, commercial buildings, etc. are becoming a relied-upon solution. DC grids, nanogrids, microgrids, etc. are being used to connect to renewable energy sources and renewable energy storage devices because of the relatively higher efficiency and reliability under certain circumstances.

A number of power converters can be connected in parallel to supply power to a DC power grid or network. Typically, when an electric load is applied to a DC grid, the power converters connected to the DC grid each contribute to the supply of power, in part, provided to the load. When a number of power converters are connected together in parallel, droop control can be used to facilitate load/current sharing between them without the need for dedicated communication control links between them.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, a number of power converters can be connected in parallel to supply power to a direct current (DC) power grid or network. Typically, when an electric load is applied to the DC grid, the power converters connected to the DC grid each contribute to the supply of power, in part, provided to the load. When a number of power converters are connected together in parallel, droop control can be used to facilitate load (i.e., current) sharing between them without the need for dedicated communications or control links between them. In other words, droop control can be used to prioritize the amount of power provided to one or more loads by different energy sources, such as the electric utility, renewable energy, and energy storage sources.

In the field of power converter paralleling, droop control methods can be classified into various categories according to different realization methods. In traditional alternating current (AC) power systems, the concept of droop control is to control and balance the active and reactive power between a number of synchronous generators. Specifically, the active power is controlled by frequency droop while the reactive power is controlled by voltage droop.

Regardless of the manner in which implemented, droop control generally adopts a constant droop resistance and has design trade-offs. Larger droop resistance helps to improve load sharing accuracy but compromises voltage regulation. In that case, better current sharing leads to worse voltage regulation. In practice, the discrepancies and variations among power converters, sensors, and conductor resistances all influence load sharing performance. Increasing droop resistance helps relieve the impact of these variations, but the maximum droop resistance is limited by the voltage regulation requirement and cannot be too large.

To improve load sharing performance without sacrificing too much voltage regulation, the range of droop control can be split into segments and different slopes used to suppress current sharing error caused by voltage set-point inaccuracy. In some gain scheduling techniques, the adjustment of a droop curve is realized by changing the DC gain of the compensator. The gain is picked by looking at a group of fixed droop curves and picking one that has a desirable DC gain for each discretized segment.

According to aspects of non-linear droop control described herein, the derivation of the droop curve is continuous and more natural than in conventional techniques. The droop curve is directly generated by using a non-linear function such as a parabola, ellipse, or other function. By generating the droop curve using non-linear functions, the benefits of near-zero droop resistance at low loads and near-infinite droop resistance at high loads can be realized. In conventional techniques, load sharing improvements are limited because they relieve unbalances using larger dc gains only for certain loads or load ranges. According to the embodiments, however, droop resistance at full load approaches an infinite resistance, and the impact from conductor resistances can be nearly eliminated.

In one example, a system includes a first power converter or source configured to provide power to a bus, a second power converter or source configured to provide power to the bus, and a load electrically coupled to the bus. The system also includes a controller configured to adjust a droop resistance associated with the first power source according to a continuous non-linear function based on an amount of current supplied to the load by the first power source. The system can also include a second controller configured to adjust a droop resistance associated with the second power source according to the continuous non-linear function (or another continuous non-linear function). The use of the continuous non-linear functions achieves tighter voltage regulation particularly at lower loads and better load sharing at higher loads.

Figure 1:
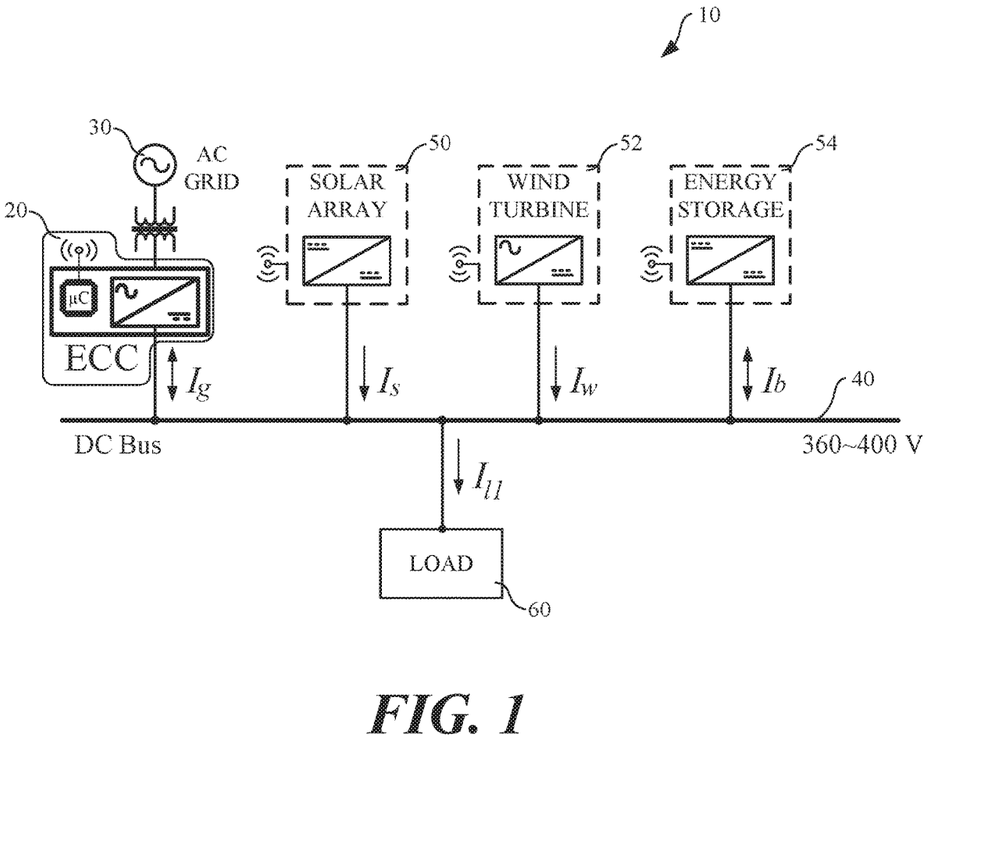
FIG. 1 illustrates a schematic of an example DC nanogrid according to various examples described herein.

FIG. 1 illustrates a schematic of an example DC nanogrid 10. In the DC nanogrid 10, the interface converter system 20 converts AC power from the AC utility grid 30 to DC power for the DC bus 40. A solar energy source 50, a wind energy source 52, and an energy storage source 54 (e.g., battery storage) also provide DC power to the DC bus 40.

From the DC bus 40, DC power is provided to the load 60. Particularly, one or more of the interface converter system 20, solar energy source 50, wind energy source 52, and energy storage source 54 can provide power in parallel (i.e., each in part) to the load 60 over the bus. Droop control, as described in further detail below, can be used to facilitate load or current sharing between the interface converter system 20, solar energy source 50, wind energy source 52, and energy storage source 54 without the need for dedicated communications or control links between them. Further, although a single load 60 is shown in FIG. 1, droop control can be used to facilitate load or sharing between any number of different loads.

Figure 2A:
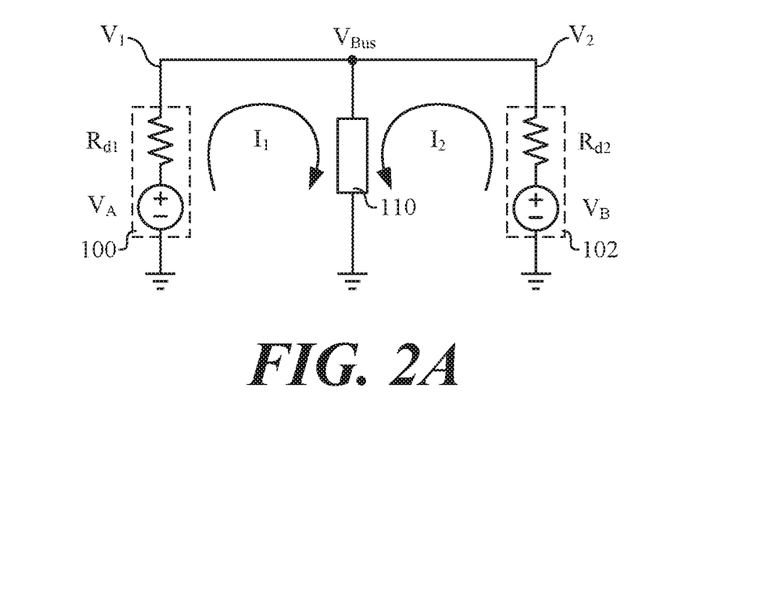
FIG. 2A illustrates two power sources connected to a common DC bus according to various examples described herein.

FIG. 2A illustrates two representative power converters or power sources 100 and 102 connected to a common DC bus, $V_{Bus}$, according to various examples described herein. The power sources 100 and 102 can be embodied as any suitable power converters or power sources of any known type and/or topology, such as buck and boost converters, among others, including any number of power transistors arranged in any type of configuration to convert/provide power. The power converters or power sources can include power interface converters that supply power from renewable energy sources and energy storage sources, among others. As shown in the example in FIG. 2A, the power source 100 includes a power supply $V_A$ and a representative droop resistance $R_{d1}$, and the power source 102 includes a power supply $V_B$ and a representative droop resistance $R_{d2}$. The power supply $V_A$ sources current $I_1$ to a load 110, and the power supply $V_B$ sources current $I_2$ to the load 110. In the arrangement shown in FIG. 2A, no line or cable resistance is considered between the power sources 100 and 102 and the load 110. Further, a two-source system is illustrated in FIG. 2A to simplify the discussion below, but the concepts can be generalized to the use of multiple power converters and any number of loads. Thus, the concepts described herein can be extended to any number of different power converters coupled to a DC grid to supply power to any number of loads.

Figure 2B:
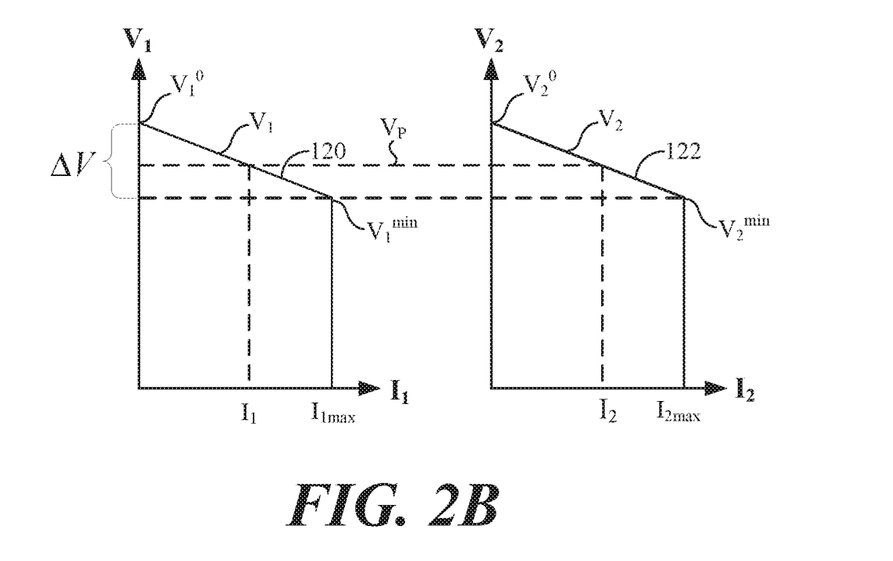
FIG. 2B illustrates examples of output characteristics of the two power sources shown in FIG. 2A according to various examples described herein.

FIG. 2B illustrates example output characteristics 120 and 122 of the two power sources 100 and 102, respectively, shown in FIG. 2A. In general, $V_1$ and $V_2$ are the output terminal voltages of the power sources 100 and 102, respectively, along the output characteristics 120 and 122. The output characteristics 120 and 122 of the two power sources 100 and 102 can be evaluated according to Equation (1) below.

$V_1^0$ and $V_2^0$ are the no-load voltage set-points of the power sources 100 and 102, and $V_1^{min}$ and $V_2^{min}$ are the full-load voltage set-points of the power sources 100 and 102, respectively, and correspond to the maximum output currents $I_{1\,max}$ and $I_{2\,max}$. Between the no-load and full-load voltage set-points, $\Delta V$ is the droop voltage range. At voltage $V_P$, the output terminal voltages $V_1$ and $V_2$ of the power sources 100 and 102 correspond to the output currents $I_1$ and $I_2$. For load currents beyond the maximum output currents $I_{1\,max}$ and $I_{2\,max}$, the power sources 100 and 102 will enter current limiting mode and the voltage on $V_{Bus}$ can start to collapse.

Because the two power sources 100 and 102 are connected to the common bus, $V_{Bus}$, $V_1 = V_2 = V_{Bus}$. From that basis, Equation (2) can be derived according to the load shared between the two power sources 100 and 102 based on the ratio of their droop resistances $R_{d1}$ and $R_{d2}$. Droop resistance is often designed to be inverse proportional to the rating of a power converter or supply. In that case, load can be shared in proportion to the rating of the power converter, and the power converter or power source with greater output rating or capacity can contribute more power to the load.

$$v_1 = v_1^0 - i_1 R_{d1}, \; v_2 = v_2^0 - i_2 R_{d2} \qquad (1)$$

$$\frac{i_1}{i_2} = \frac{R_{d2}}{R_{d1}}, \; i_1 = \frac{R_{d2}}{R_{d1} + R_{d2}} i_{Load}, \; i_2 = \frac{R_{d1}}{R_{d1} + R_{d2}} i_{Load} \qquad (2)$$

Figure 3A:
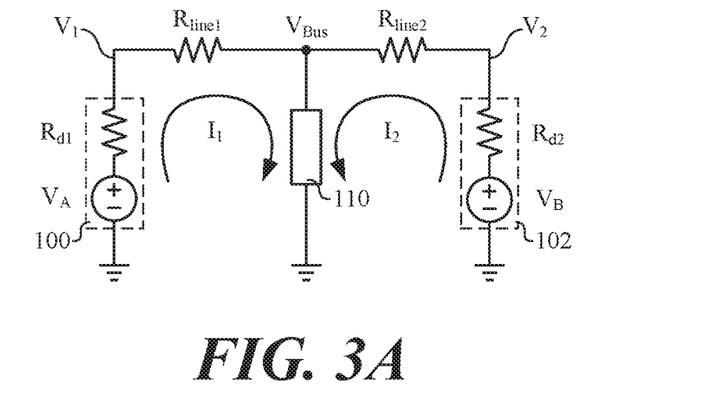
FIG. 3A illustrates two power sources connected to a common DC bus with cable or line resistances according to various examples described herein.
Figure 3B:
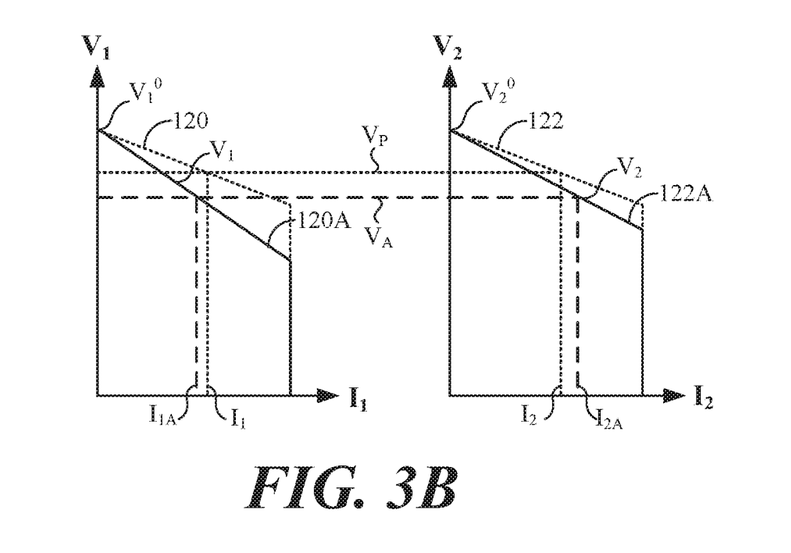
FIG. 3B illustrates examples of output characteristics of the power sources shown in FIG. 2A as compared to FIG. 3A according to various examples described herein.

In practice, however, the power sources 100 and 102 are likely to be distributed and the line or cable resistances between the power sources 100 and 102 and the load 110 should be considered. In that context, FIG. 3A illustrates the power sources 100 and 102 connected to $V_{Bus}$ with different cable or line resistances $R_{line1}$ and $R_{line2}$. FIG. 3B illustrates an example of the output characteristics 120 and 122 shown in FIG. 2A compared with output characteristics 120A and 122A of the power sources 100 and 102 connected to the load 110 through the resistances $R_{line1}$ and $R_{line2}$.

As shown in FIG. 3B, the output terminal voltages $V_1$ and $V_2$ of the power sources 100 and 102 at voltage $V_A$ correspond to the output currents $I_{1A}$ and $I_{2A}$. While the difference in voltage between the output voltages $V_P$ and $V_A$ is the same for both the power sources 100 and 102, the difference in current between the output currents $I_{1A}$ and $I_1$ for the power source 100 is not the same as the difference in current between the output currents $I_{2A}$ and $I_2$ for the power source 102. The difference leads to an unbalanced or uneven sharing of the load 110. In other words, the different cable or line resistances $R_{line1}$ and $R_{line2}$ lead to an unbalanced supply of power from the power sources 100 and 102 to the load 110.

Considering the line resistances $R_{line1}$ and $R_{line2}$, Equation (1) can be updated as shown in Equation (3) and Equation (2) can be updated as shown in Equation (4).

$$v_{Bus} = v_1^0 - i_1(R_{d1} + R_{line\ 1}) = v_2^0 - i_2(R_{d2} + R_{line\ 2}) \quad (3)$$

$$\frac{i_1'}{i_2'} = \frac{R_{d2} + R_{line\ 2}}{R_{d1} + R_{line\ 1}} = \frac{R_{d2}'}{R_{d1}'}, \ i_1' = \frac{R_{d2}'}{R_{d1}' + R_{d2}'} i_{Load}, \quad (4)$$

$$i_2' = \frac{R_{d1}'}{R_{d1}' + R_{d2}'} i_{Load}$$

Difference between (2) and (4) indicates the sharing error in Equation (5) and can be expressed as a function of its ideal value as shown in Equation (6).

$$\Delta I = I_{s1}' - I_{s1} = \frac{\frac{R_{d1}}{R_{d2}} - \frac{R_{d1}'}{R_{d2}'}}{\left(\frac{R_{d1}}{R_{d1}} + 1\right)\left(\frac{R_{d1}'}{R_{d2}'} + 1\right)} I_L \quad (5)$$

$$\Delta I\ \% = \frac{\Delta I}{I_{s1}} = \frac{\frac{R_{d1}}{R_{d2}} - \frac{R_{d1}'}{R_{d2}'}}{\left(\frac{R_{d1}'}{R_{d2}'} + 1\right)} \quad (6)$$

Equation (6) defines the current sharing error in terms of a percentage. By increasing the droop resistance, sharing error can be reduced. At the same time, however, deviations in $V_{Bus}$ are increased.

Figure 4:
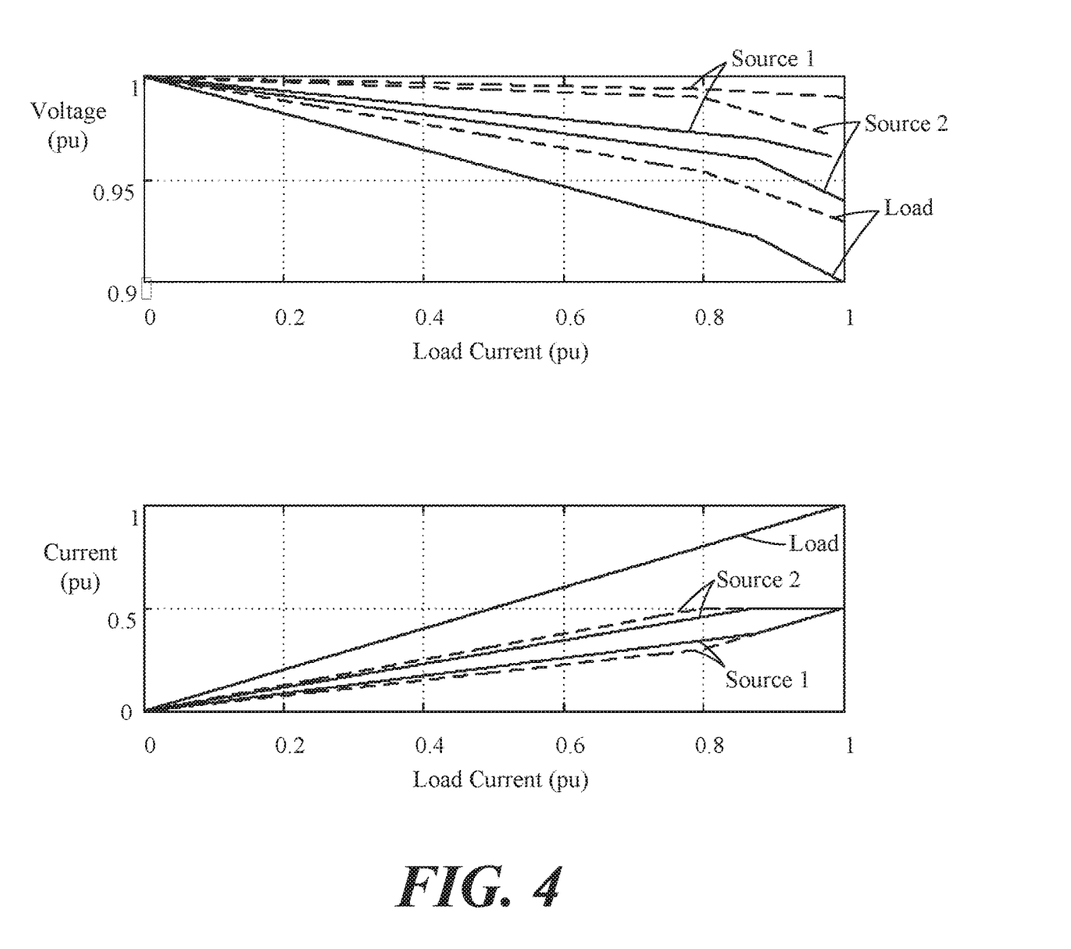
FIG. 4 illustrates a load sharing comparison for different droop resistances for a given line resistance according to various examples described herein.

FIG. 4 illustrates a load sharing comparison when the droop resistances $R_{d1}$ and $R_{d2}$ are 0.02 per unit (pu) and 0.08 pu with 0.02 pu of line resistance. In FIG. 4, the dashed lines are representative of when the droop resistances $R_{d1}$ and $R_{d2}$ are 0.02 pu, and the solid lines are representative of when the droop resistances $R_{d1}$ and $R_{d2}$ are 0.08 pu.

Figure 5:
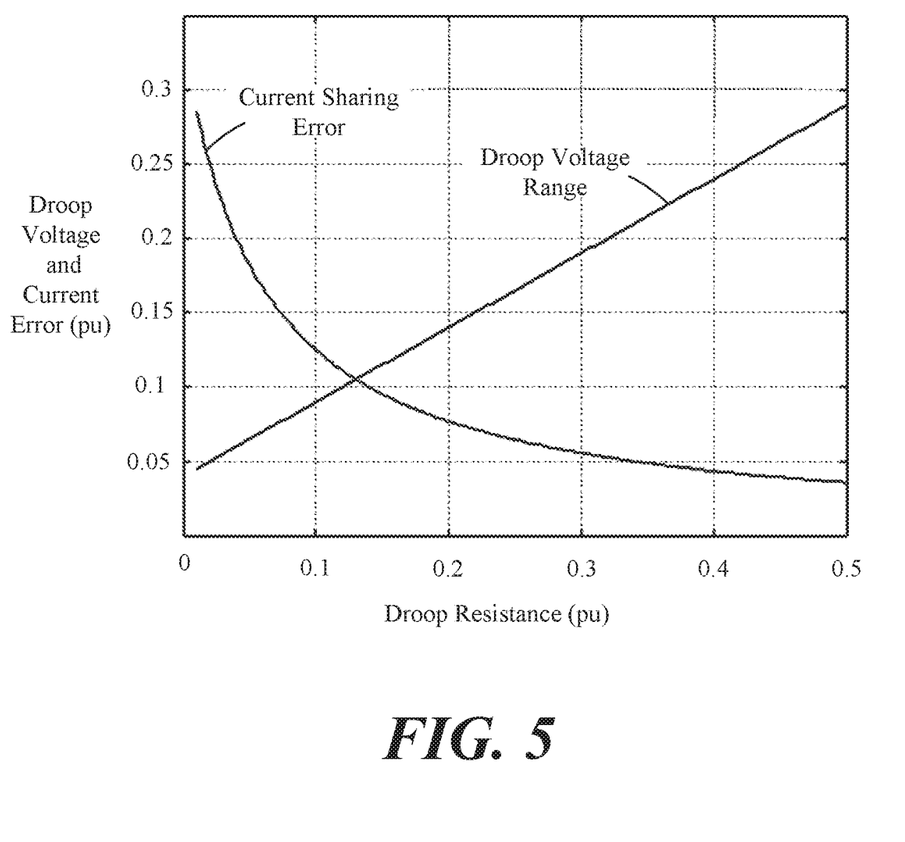
FIG. 5 illustrates the trade-off between droop voltage range and current sharing accuracy with different droop resistances according to various examples described herein.

FIG. 5 illustrates the trade-off between droop voltage range and current sharing accuracy with different droop resistances. As shown, larger droop resistance leads to better load sharing (i.e., lower current sharing error), but the necessary droop voltage range is also bigger. At heavy loads, larger droop voltage ranges can be unacceptable.

As outlined above, larger droop resistances offer the advantage of better load sharing but sacrifice voltage regulation stiffness. Smaller droop resistances lead to smaller droop voltage ranges but are more sensitive to differences in line or cable resistances. In traditional droop designs with constant droop resistances, a trade-off is made between voltage regulation stiffness and load sharing accuracy. The process of droop design for power converters can follow the following steps: (1) choose the droop curve start point based on the no-load voltage set-point, (2) choose the droop curve end point based on the maximum current load and lower limit of the DC bus voltage, and (3) choose the droop resistance to provide a linear or straight line droop curve connecting the start point and the end point. In practice, the maximum current load and DC bus voltage range are predetermined by system specifications. Thus, the start point and end point of the droop curve are effectively predefined by the system specifications. The only freedom is to optimize the trajectory between the start and end points.

Figure 6:
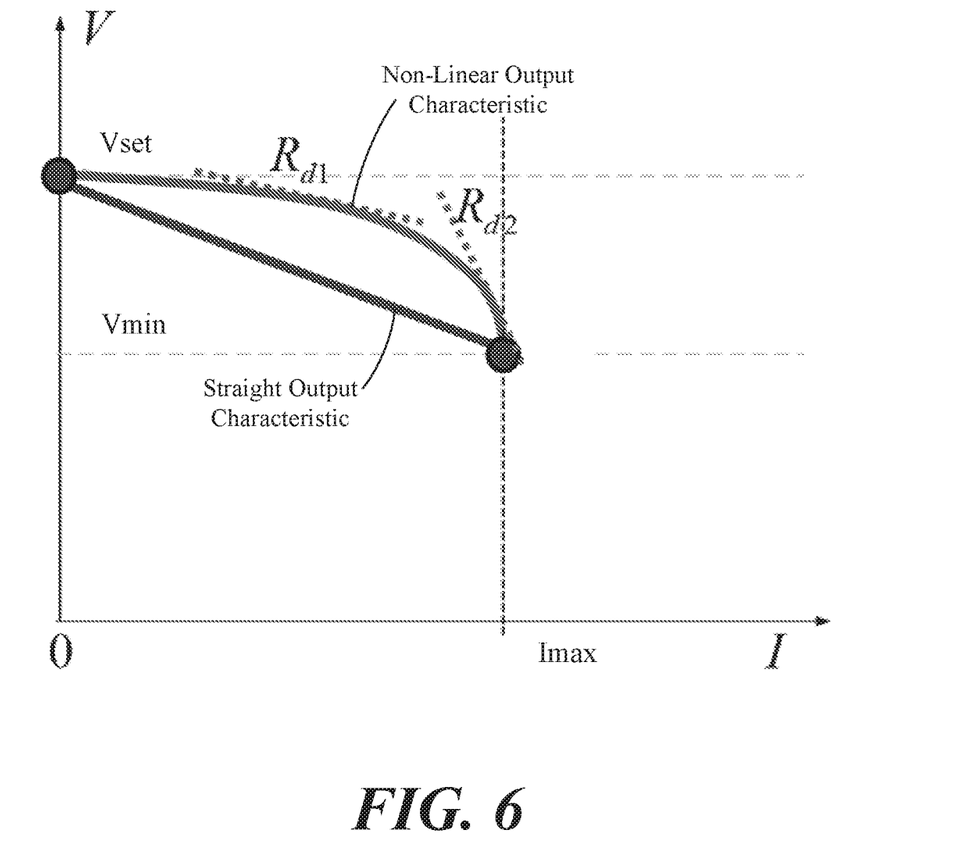
FIG. 6 illustrates a traditional linear or straight output characteristic as compared to a curved output characteristic droop design according to various examples described herein.

FIG. 6 illustrates a straight output as compared to a curved output characteristic droop design according to various examples described herein. In FIG. 6, the straight output characteristic results from a traditional droop design and the curved output characteristic is representative of a non-linear droop design according to the concepts described herein. By examining the droop resistance along the curved output characteristic line, which is the slope of the tangent along the curved line, some desirable characteristics can be identified. First, the curved output characteristic offers larger droop resistance at heavy load, which enables better load sharing. Second the curved output characteristic has smaller droop resistance at light load, which enables tighter voltage regulation.

Because uneven load sharing leads to source saturation and accelerates bus voltage drop, accurate load sharing is particularly important under heavy load conditions. On the other hand, at light load conditions, load sharing accuracy is not as important as long as power sources are working within their safe operating ranges. At light load conditions, tighter voltage regulation with smaller droop resistances can be beneficial, at the same time, at least because higher bus voltages can lead to lower currents and higher system efficiency.

There are numerous ways to implement a curved output characteristic between a pair of defined droop start and end points. For example, the traditional first order and three second order options, including parabola, inverse parabola, and ellipse, are evaluated in Equations (7)-(10) below and compared to demonstrate the effectiveness of the concepts described herein. In Equations (7)-(10), v is the voltage reference corresponding to current i, $V^0$ is the no-load voltage set-point, $\Delta V$ is the designed droop voltage range, and $I_{max}$ is the source maximum output current.

$$\text{Linear: } v = V^0 - iR_d \quad (7)$$

$$\text{Parabola: } v = V^0 - a_1 i^2 \text{ where } a_1 = \frac{\Delta V}{I_{max}^2} \quad (8)$$

$$\text{Inverse Parabola: } v = V^0 - \Delta V + \sqrt{1 - i/I_{max}} \cdot \Delta V \quad (9)$$

$$\text{Ellipse: } v = V^0 - \Delta V + \sqrt{1 - (i/I_{max})^2} \cdot \Delta V \quad (10)$$

Figure 7:
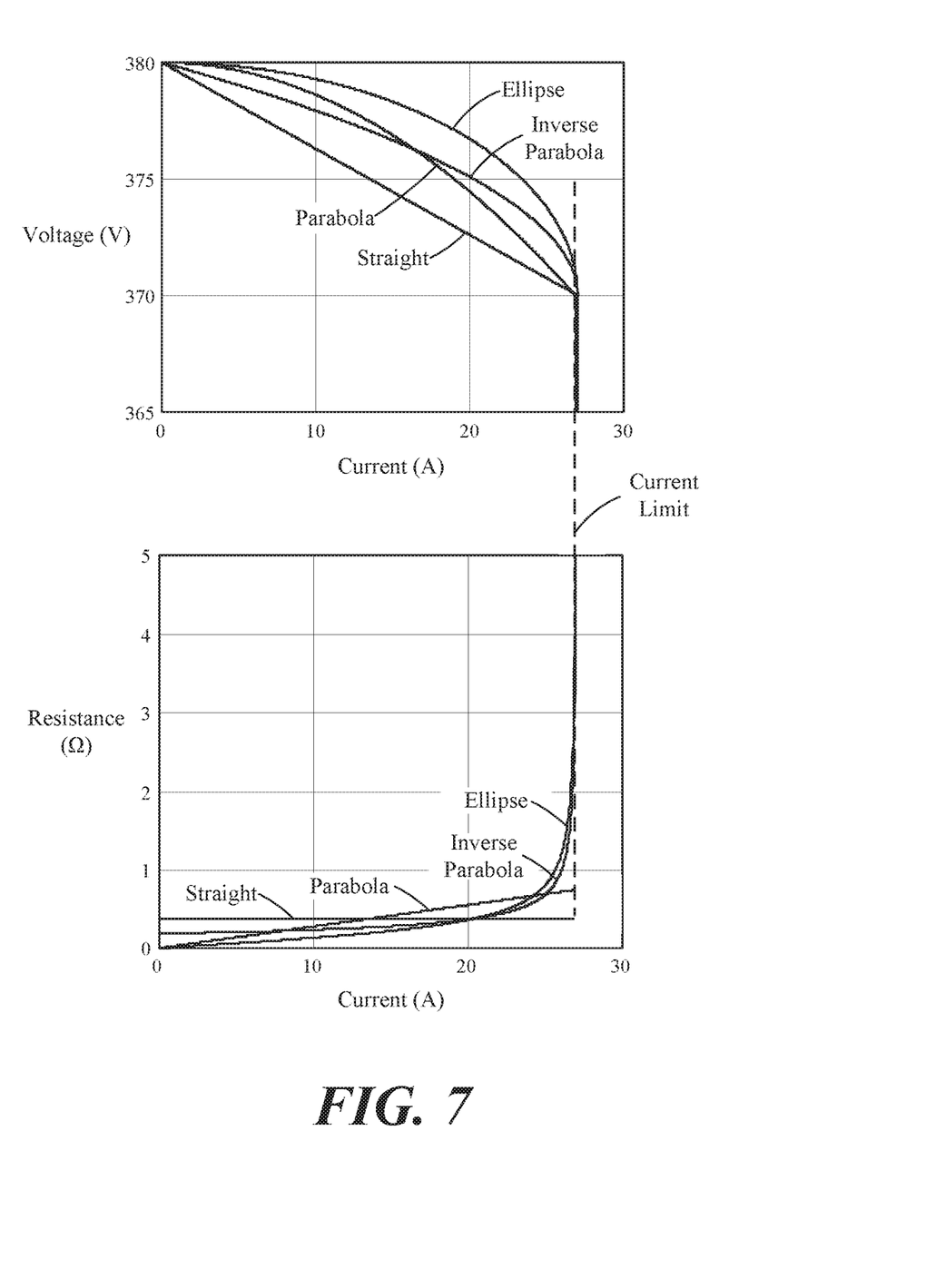
FIG. 7 illustrates three different curved output characteristic droop designs and droop resistances as compared to the straight output characteristic according to various aspects of the embodiments.

In all the Equations (7)-(10), $i \leq I_{max}$. When $i = I_{max}$, the power source will work in current limiting mode, power limiting, or other desired mode. FIG. 7 illustrates three different curved output characteristic droop designs and droop resistances as compared to the traditional straight output characteristic. In the example shown in FIG. 7, the bus voltage range is chosen as 370 V to 380 V, and the source rating is 10 kW. The maximum output current at 370 V is around 27 A.

FIG. 7 illustrates that the traditional linear droop has a fixed droop resistance over load range. The parabola has nearly zero slope at no-load. Thus, at very light load conditions, the line resistance determines how the load is shared among multiple sources in the case of the parabola. At full load conditions, the droop resistance of the parabola is bigger than the traditional linear droop, but it does not continue to approach greater resistances. The inverse parabola and ellipse both approach infinite droop resistance at full load conditions, which can help to reduce the impact from line resistances. The transition between voltage regulation mode and current limit mode is also smoother for the inverse parabola and the ellipse because no abrupt slope change occurs heading into current limiting mode. The inverse parabola and the ellipse also help to improve system stability because of the strengthened damping effect. One difference between the inverse parabola and the ellipse is that ellipse approaches zero resistance at no-load while the inverse parabola has some limited value of resistance at no-load.

The droop resistances of the linear, parabola, inverse parabola, and ellipse droop designs at no-load and full load are summarized in Table I below.

TABLE 1

| Type | No-load Resistance | Full-load Resistance |
|---|---|---|
| Linear | Fixed | Fixed |
| Parabola | 0 (or near 0) | Limited |
| Inverse Parabola | Limited | Approaches ∞ |
| Ellipse | 0 (or near 0) | Approaches ∞ |

Figure 8A:
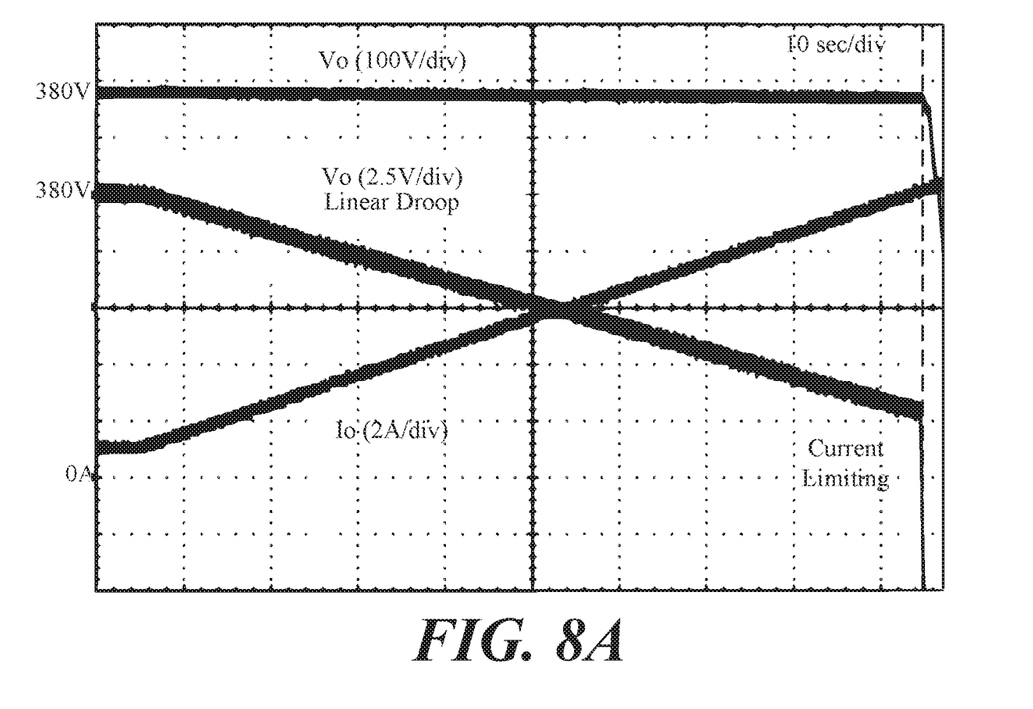
FIGS. 8A and 8B illustrate linear or straight and non-linear droop testing, respectively, according to various aspects of the embodiments.
Figure 8B:
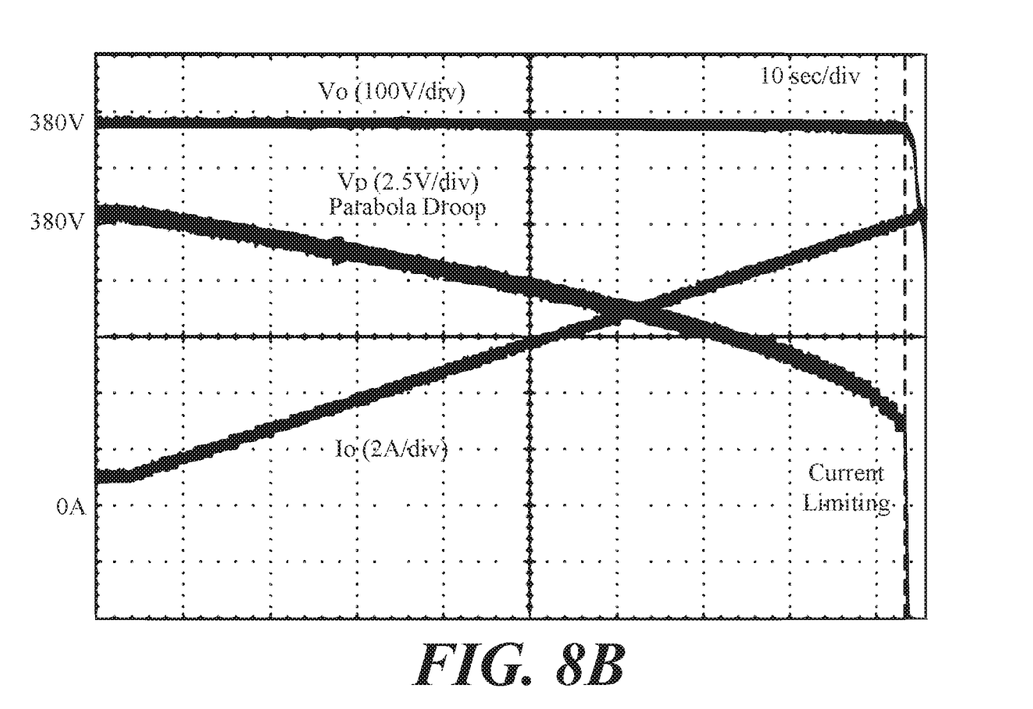

FIGS. 8A and 8B illustrate traditional straight and non-linear droop testing, respectively. In both FIGS. 8A and 8B, the power sources droop from 380 V. The droop voltage range and maximum current is set as 10 V and 10 A, respectively. FIG. 8A shows the traditional straight or linear droop V-I curve with fixed droop resistance. When the output current increases linearly, the output voltage also drops linearly as a straight line. FIG. 8B shows a curved droop parabola trajectory. When the output current linearly increases from 0 to 10 A, the regulated output voltage drops from 380 V to 370 V along a smooth curve. In both cases, when the output current reaches the current limit, the power source or power converter transitions into current limiting mode. If the load continues to increase, the bus voltage will drop rapidly as shown.

Figure 9A:
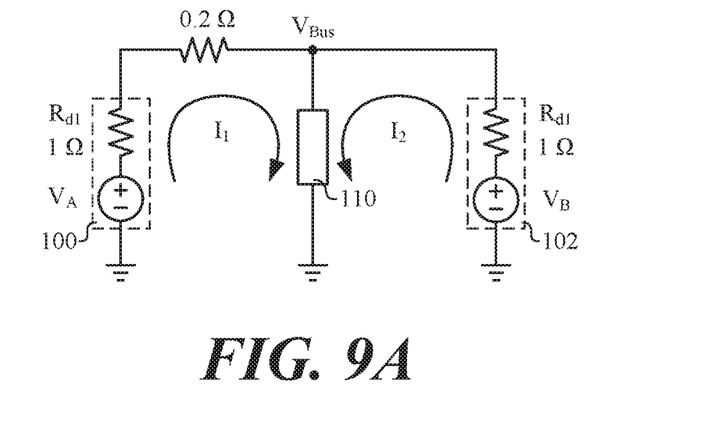
FIG. 9A illustrates an example two source system incorporating linear droop control according to aspects of the embodiments.
Figure 9B:
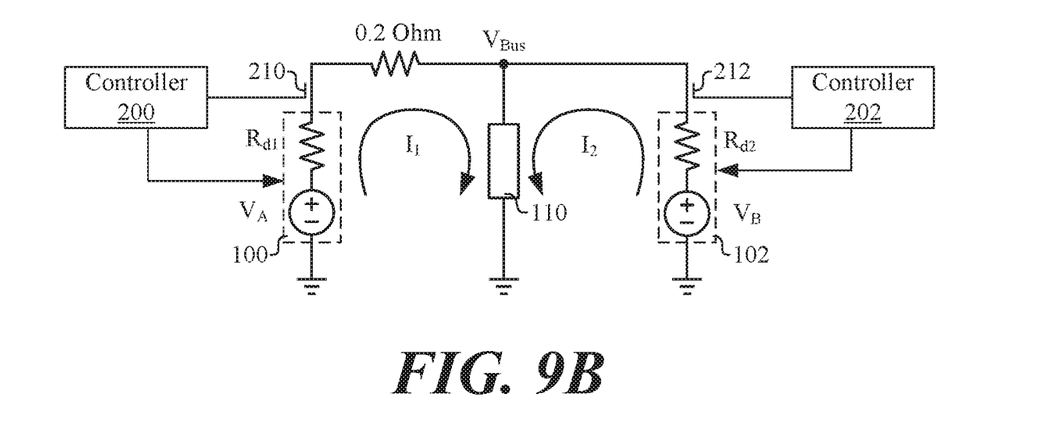
FIG. 9B illustrates an example two source system incorporating non-linear droop control according to aspects of the embodiments.

FIG. 9A illustrates an example two source system incorporating linear droop control, and FIG. 9B illustrates an example two source system incorporating non-linear droop control. Again, two-source systems are illustrated in FIGS. 9A and 9B, but the concepts can be generalized to the use of multiple power converters and any number of loads. For example, the system incorporating non-linear droop control as shown in FIG. 9B can be extended to any number of different power converters coupled to the same DC grid to supply power to any number of loads. Any of the power converters in such a multi-converter arrangement can include controllers similar to the controllers 200 and 202.

For the purpose of the examples outlined below in connection with both FIGS. 9A and 9B, the power source 100 can be embodied as a buck converter and the power source 102 can be embodied as a boost converter. For both cases, the power sources 100 and 102 are connected to $V_{Bus}$, and a representative 5-meter AWG 18 cable (at about 0.2Ω) is inserted between the power source 100 and the load 110. The no-load $V_{Bus}$ voltage is set at 380 V, the current limit for the power sources 100 and 102 is set at 7.5 A, and the load 110 is embodied as a programmable electric load to generate a linear load ramp-up to full load. In the example shown in FIG. 9A, the droop resistances $R_{d1}$ and $R_{d2}$ are chosen to be 1Ω. Thus, the droop voltage range is 7.5 V. To be comparable, the droop voltage range for the example shown in FIG. 9B is also set to be 7.5 V.

In FIG. 9A, the droop resistances $R_{d1}$ and $R_{d2}$, which are representative, can vary according to the controllers 200 and 202. FIG. 9B shows the controller 200 for the power source 100 and the controller 202 for the power source 102. The controller 200 is configured to sense the amount of current $I_1$ supplied to the load 110 by the power source 100 (or the amount of inductor current in the power source 100) using the current sensor 210 or another suitable means. The controller 200 is further configured to effectively adjust the droop resistance of $R_{d1}$ according to a continuous non-linear function based on the amount of current $I_1$ through control of the power source 100. Similarly, the controller 202 is configured to sense the amount of current $I_2$ supplied to the load 110 by the power source 102 (or the amount of inductor current in the power source 102) using the current sensor 212 or another suitable means. The controller 202 is further configured to effectively adjust the droop resistance of $R_{d2}$ according to a continuous non-linear function based on the amount of current $I_2$. In one example case, the controller 200 and the controller 202 are both designed to operate according to the same continuous non-linear function to provide the same output droop characteristic, but the controllers 200 and 202 can operate according to different non-linear functions or a combination of linear and non-linear functions. In the results shown in FIG. 10B, the controller 200 and the controller 202 are both designed to operate according to the same inverse parabolic function of Equation (9), but other continuous non-linear function (including those in Equations (7)-(10) and others) can be used.

Figure 10A:
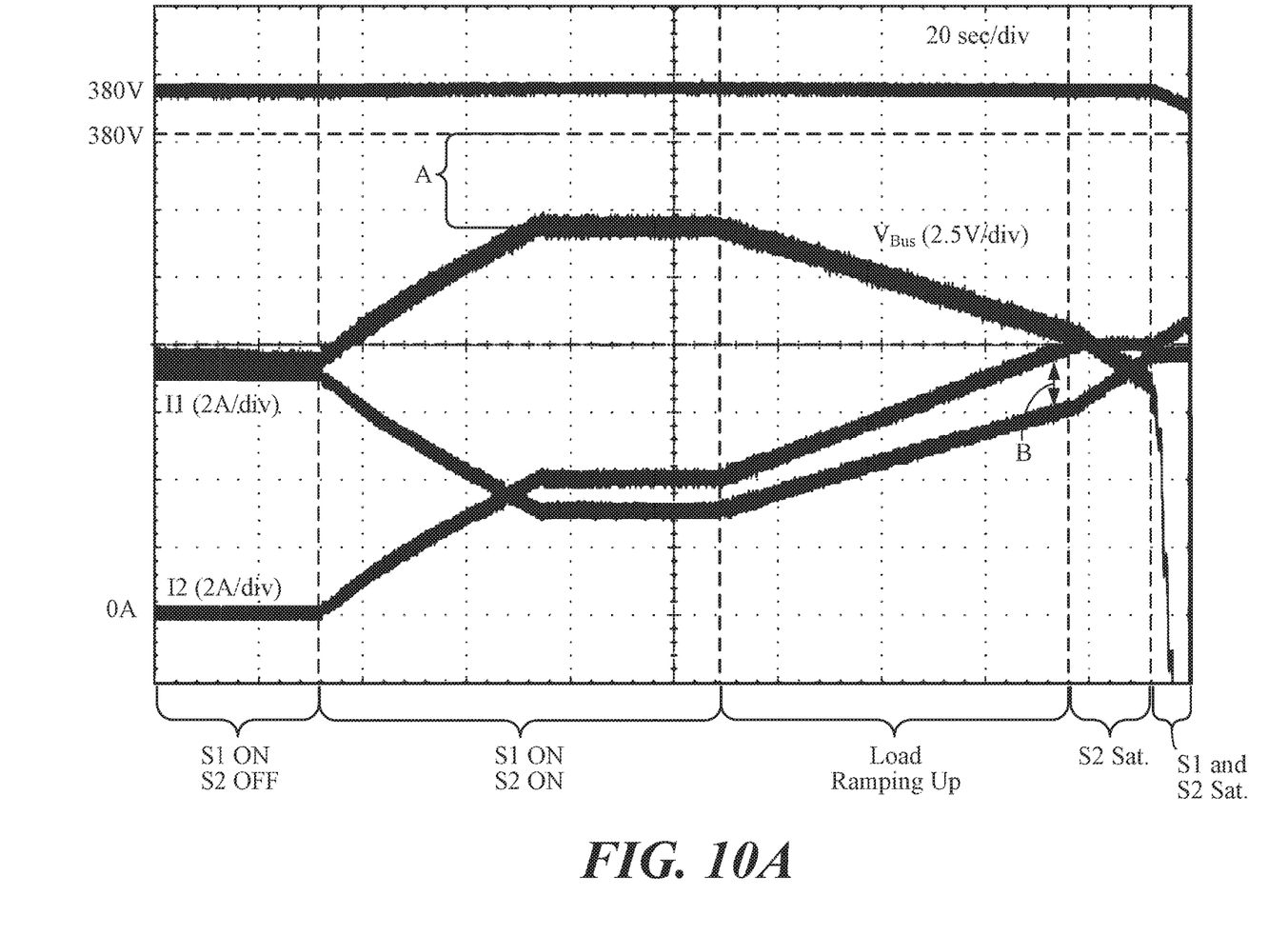
FIG. 10A illustrates an example of linear droop control using the two source system shown in FIG. 9A according to aspects of the embodiments.
Figure 10B:
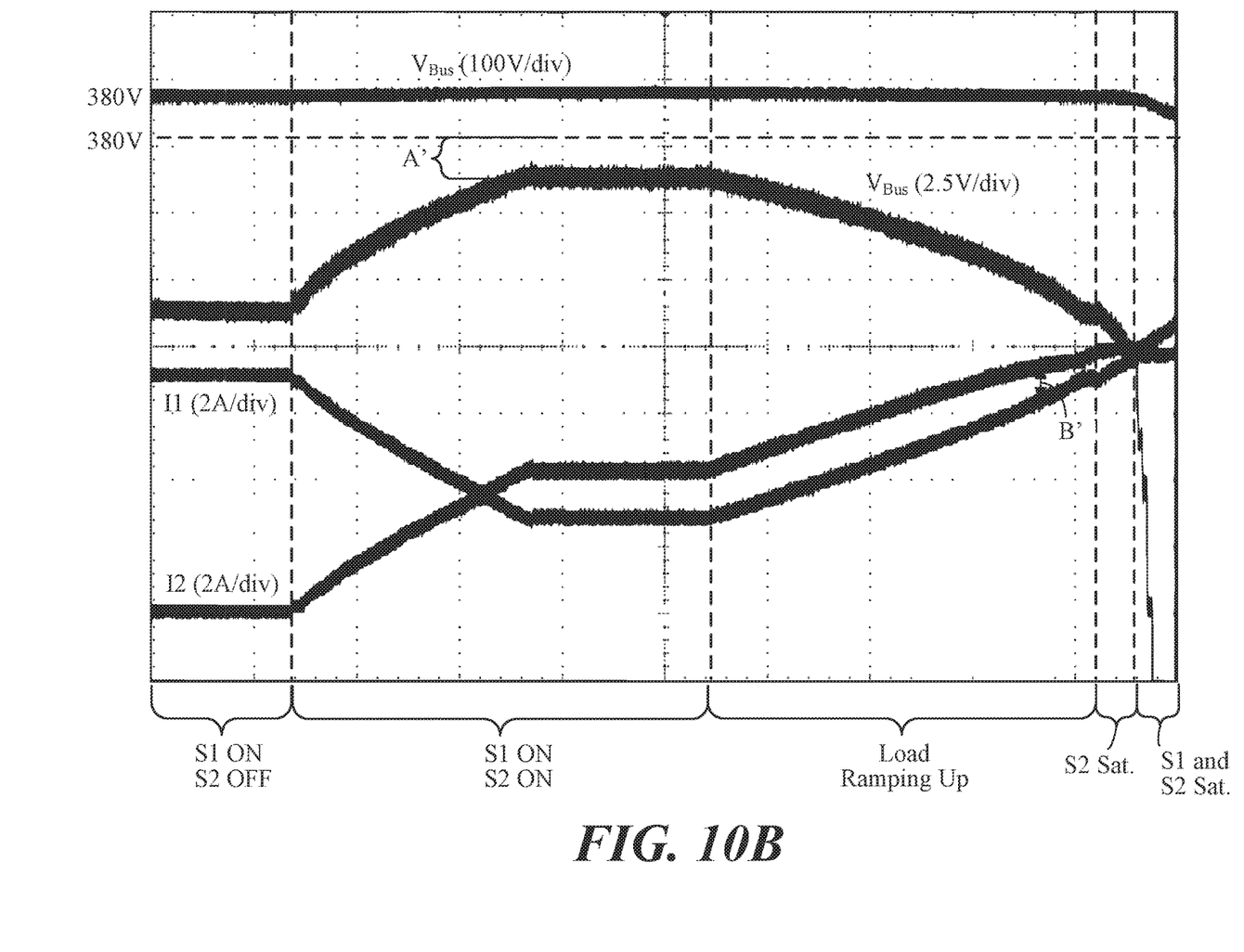
FIG. 10B illustrates an example of non-linear droop control using the two source system shown in FIG. 9B according to aspects of the embodiments.

FIG. 10A illustrates an example of linear droop control using the two source system shown in FIG. 9A according to aspects of the embodiments, and FIG. 10B illustrates an example of non-linear droop control using the two source system shown in FIG. 9B. During the first stage in FIGS. 10A and 10B, only the power source 100 is on (i.e., power source 100 S1 ON, power source 102 S2 OFF). Thus, the power source 100 provides all the power to the load 110.

Beginning at the second stage, the power source 102 starts (i.e., S1 ON, S2 ON). After a period of soft start-up, the power sources 100 and 102 reach a steady state providing power to the load 110.

As shown in both FIGS. 10A and 10B, the power source 102 provides more power (i.e., more current) to the load 110 than the power source 100 in either case due to the added resistance of the 5-meter AWG 18 cable (at 0.2 Ohm) between the power source 100 and the load 110.

At the third stage, the load 110 is triggered to ramp up. During (and after) the ramp up period, power sources 100 and 102 both provide power to the load 110. After the ramp up period, one advantage of non-linear droop control can be seen by a comparison between FIGS. 10A and 10B. At light load, non-linear droop control achieves tighter voltage regulation. Particularly, the voltage difference "A" between the no-load 380V design setting and $V_{Bus}$ is larger in FIG. 10A than the voltage difference "A'" in FIG. 10B. Thus, it clear that non-linear droop control can achieve tighter voltage regulation at light load. As discussed above, this is characteristic can be attributed to the relatively low (or lower) droop resistance at light load according to the concepts of non-linear droop control described herein.

In the fourth stage, the load 110 ramps up. During this load ramp up period, the difference in current supplied by the power source 100 and the power source 102 increases in FIG. 10A for the case of linear droop control but decreases in FIG. 10B for the case of non-linear droop control. This difference is shown by the larger difference in current "B" supplied by the power source 100 as compared to the power source 102 for linear droop control in FIG. 10A verses the relatively smaller difference in current "B'" supplied by the power source 100 as compared to the power source 102 for non-linear droop control in FIG. 10B. Thus according to the concepts of non-linear droop control described herein, sharing error decreases automatically as the load 110 increases. For linear droop control, the sharing error increases when the load 110 increases. Further, a comparison of the total voltage deviation from the no-load point to the point where both sources saturate, the voltage deviation for non-linear droop control stays within the designed 7.5 V droop voltage range. On the other hand, linear droop control requires another 2 V below the designed 7.5 V.

Figure 11:
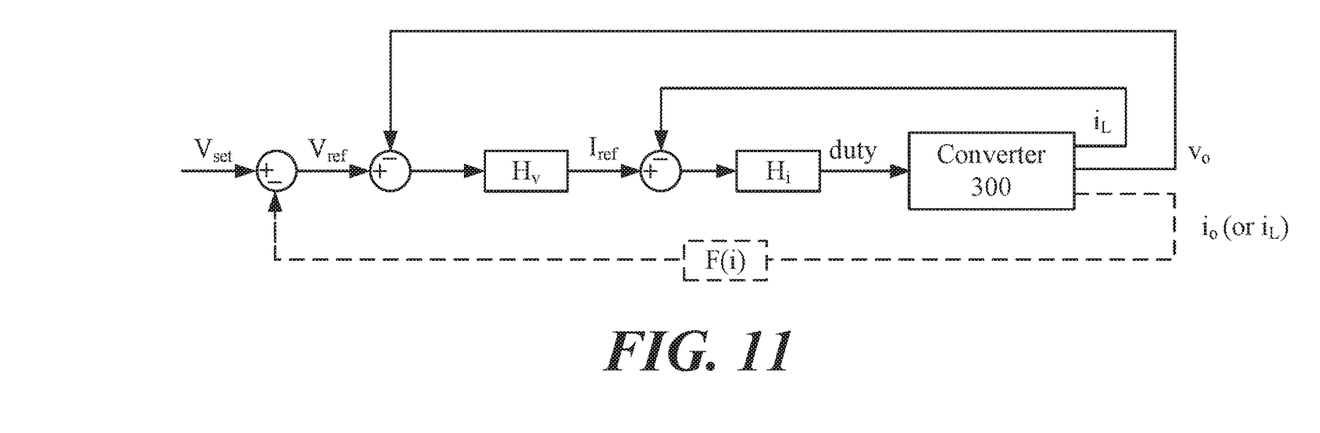
FIG. 11 illustrates an example power converter and control loops for non-linear droop control according to aspects of the embodiments.

FIG. 11 illustrates an example power converter 300 and control loops for non-linear droop control according to aspects of the embodiments. The power converter 300 and control loops shown in FIG. 11 are a representative example of the power source 100 and controller 200 and/or the power source 102 and controller 202 shown in FIG. 9A. The power converter 300 can be embodied as any suitable power converter or power source of any known type and/or topology, such as a buck or boost converter, among other types of converters, including any number of power transistors arranged in any type of configuration. The control loops shown in solid black lines, including the Hi and Hv current and voltage controllers, respectively, are configured to regulate the output power of the converter 300. In that context, the output power of the converter 300 is based on the inductor current $i_L$ or the output current io in the converter 300 and the output voltage $v_o$ of the converter 300. Iref and Vref are the references for the current and voltage outputs of the converter 300, respectively.

The control loop including the controller F(i) shown in dashed lines in FIG. 11 is for droop control. In various cases, the control loop for droop control is configured to sense the output current $i_o$, inductor current $i_L$, or output power of the converter 300 and to generate a signal to adjust the no-load voltage set point Vset and generate a new voltage reference Vref corresponding to the output. In other, conventional approaches, the feedback gain is a constant for a fixed droop resistance. In the approach according to the examples described herein, the gain is embodied at least in part as the controller function F(i), such as a second order function like those in Equations (8)-(10), among others. Thus, the equivalent droop resistance varies depending on the working point.

Figure 12:
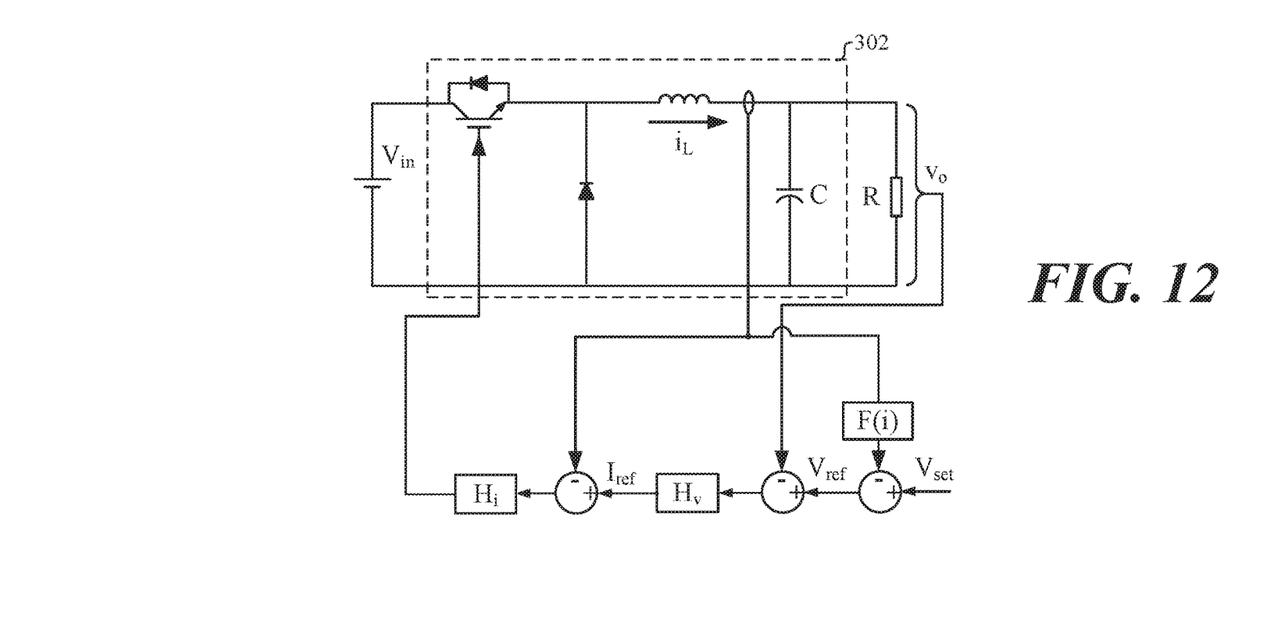
FIG. 12 illustrates an example buck power converter and control loop for non-linear droop control according to aspects of the embodiments.

FIG. 12 illustrates an example buck power converter 302 and control loop for non-linear droop control according to aspects of the embodiments. The buck power converter 302 is one representative example of the converter 300 shown in FIG. 11. As shown in FIG. 12, the control loop including the controller F(i) is configured to sense the output inductor current $i_L$, of the converter 302 to generate a signal representative of the voltage deviation from the voltage set point Vset. The gain is embodied at least in part as the controller function F(i), such as a second order function like those in Equations (8)-(10), among others.

The controllers 200 and 202 in FIG. 9B and those shown in FIGS. 11 and 12 can be embodied as any suitable type of controller, such as a proportional integral derivative (PID) controller or a proportional integral (PI) controller. The components described herein, including the power sources and controllers can be embodied in the form of hardware, as software components that are executable by hardware, or as a combination of software and hardware. If embodied as hardware, the components described herein can be implemented as a collection of discrete analog, digital, or mixed analog and digital circuit components. The hardware can include one or more discrete logic circuits, microprocessors, microcontrollers, or DSPs, application specific integrated circuits (ASICs), programmable logic devices (e.g., field-programmable gate array (FPGAs), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter system, comprising:
   at least two power converters configured to provide power to a direct current (DC) bus over a predetermined voltage range;
   a load electrically coupled to the DC bus; and
   a controller configured to sense an amount of current supplied over the DC bus to the load by one of the at least two power converters and to adjust a droop resistance associated with the one of the at least two power converters according to a continuous non-linear function based on the amount of current supplied to the load.

2. The power converter system of claim 1, wherein the controller is configured to decrease a voltage reference associated with the one of the at least two power converters according to the continuous non-linear function to increase the droop resistance for the one of the at least two power converters in response to an increase in the amount of current supplied to the load by the one of the at least two power converters.

3. The power converter system of claim 1, wherein the controller is configured to decrease a voltage reference associated with the one of the at least two power converters according to the continuous non-linear function to increase the droop resistance for the one of the at least two power converters to approach an infinite droop resistance as the amount of current supplied to the load by the one of the at least two power converters approaches a predetermined maximum output power for the one of the at least two power converters.

4. The power converter system of claim 1, wherein the controller is configured to:
   decrease a voltage reference associated with the one of the at least two power converters according to the continuous non-linear function to approach an infinite droop resistance for the one of the at least two power converters; and
   transition the one of the at least two power converters into a current limiting mode as the amount of current supplied to the load by the one of the at least two power converters approaches a predetermined maximum output power for the one of the at least two power converters.

5. The power converter system of claim 1, wherein the controller is configured to increase a voltage reference associated with the one of the at least two power converters according to the continuous non-linear function to decrease the droop resistance for the one of the at least two power converters in response to a decrease in the amount of current supplied to the load by the one of the at least two power converters.

6. The power converter system of claim 1, wherein the controller is configured to increase a voltage reference associated with the one of the at least two power converters according to the continuous non-linear function to decrease the droop resistance for the one of the at least two power converters to approach a zero droop resistance as the amount of current supplied to the load by the one of the at least two power converters approaches zero.

7. The power converter system of claim 1, wherein an adjustment to the droop resistance results in an increase or a decrease in the droop resistance for the one of the at least two power converters.

8. The power converter system of claim 1, wherein the continuous non-linear function comprises an inverse parabolic function.

9. The power converter system of claim 1, wherein the continuous non-linear function comprises an ellipse function.

10. A system, comprising:
    at least two power sources configured to provide power to a bus;
    a load electrically coupled to the bus; and
    a controller configured to adjust a droop resistance associated with one of the at least two power sources according to a continuous non-linear function based on an amount of power supplied to the load by the one of the at least two power sources.

11. The system of claim 10, wherein the controller is configured to increase the droop resistance for the one of the at least two power sources in response to an increase in the amount of power supplied to the load by the one of the at least two power sources.

12. The system of claim 10, wherein the controller is configured to increase the droop resistance for the one of the at least two power sources to approach an infinite droop resistance as the amount of power supplied to the load by the one of the at least two power sources approaches a predetermined maximum output power for the one of the at least two power sources.

13. The system of claim 10, wherein the controller is configured to:
    decrease a voltage reference associated with the one of the at least two power sources according to the continuous non-linear function to approach an infinite droop resistance for the one of the at least two power sources; and
    transition the one of the at least two power sources into a current limiting mode as the amount of power supplied to the load by the one of the at least two power sources approaches a predetermined maximum output power for the one of the at least two power sources.

14. The system of claim 10, wherein the controller is configured to decrease the droop resistance for the one of the at least two power sources in response to a decrease in the amount of power supplied to the load by the one of the at least two power sources.

15. The system of claim 10, wherein the controller is configured to decrease the droop resistance for the one of the at least two power sources to approach a zero droop resistance as the amount of power supplied to the load by the one of the at least two power sources approaches zero.

16. The system of claim 10, wherein an adjustment to the droop resistance results in an increase or a decrease in the droop resistance for the one of the at least two power sources.

17. The system of claim 10, wherein the continuous non-linear function comprises at least one of an inverse parabolic function or an ellipse function.

\* \* \* \* \*